US009464957B2

(12) United States Patent
Chen

(10) Patent No.: US 9,464,957 B2
(45) Date of Patent: Oct. 11, 2016

(54) BASE LOAD ESTIMATION FOR A COMBINED CYCLE POWER PLANT WITH STEAM TURBINE CLUTCH

(71) Applicant: General Electric Company, Schenectady, NY (US)

(72) Inventor: Yuhui Chen, Salem, VA (US)

(73) Assignee: General Electric Company, Schenectady, NY (US)

( * ) Notice: Subject to any disclaimer, the term of this patent is extended or adjusted under 35 U.S.C. 154(b) by 597 days.

(21) Appl. No.: 13/960,091

(22) Filed: Aug. 6, 2013

(65) Prior Publication Data

US 2015/0040640 A1 Feb. 12, 2015

(51) Int. Cl.

| | |
|---|---|
| ***G01L 25/00*** | (2006.01) |
| ***F01D 15/10*** | (2006.01) |
| ***F02C 9/00*** | (2006.01) |
| ***F01K 5/02*** | (2006.01) |
| *F02C 6/18* | (2006.01) |

(52) U.S. Cl.

CPC ............... *G01L 25/00* (2013.01); *F01D 15/10* (2013.01); *F01K 5/02* (2013.01); *F02C 9/00* (2013.01); *F02C 6/18* (2013.01); *F05D 2220/64* (2013.01); *F05D 2220/72* (2013.01); *F05D 2220/76* (2013.01); *F05D 2260/4023* (2013.01); *F05D 2260/821* (2013.01); *F05D 2270/312* (2013.01); *F05D 2270/313* (2013.01); *F05D 2270/331* (2013.01); *F05D 2270/335* (2013.01); *Y02E 20/16* (2013.01)

(58) Field of Classification Search

None

See application file for complete search history.

(56) References Cited

U.S. PATENT DOCUMENTS

| | | | | |
|---|---|---|---|---|
| 6,164,057 A | 12/2000 | Rowen et al. | | |
| 2004/0011040 A1* | 1/2004 | Tanaka | F01K 23/16 | 60/698 |
| 2004/0055272 A1* | 3/2004 | Tanaka | F01K 23/101 | 60/39.182 |
| 2005/0022497 A1* | 2/2005 | Takai | F01K 23/101 | 60/39.182 |
| 2008/0021675 A1* | 1/2008 | Fehr | G06Q 10/04 | 702/182 |
| 2011/0160979 A1 | 6/2011 | Muller | | |
| 2012/0198811 A1* | 8/2012 | Johnson | F01K 23/106 | 60/39.182 |
| 2013/0145772 A1* | 6/2013 | Schlesier | F01K 13/02 | 60/775 |

FOREIGN PATENT DOCUMENTS

| | | |
|---|---|---|
| EP | 1387045 A2 | 2/2004 |
| EP | 1503047 A1 | 2/2005 |

OTHER PUBLICATIONS

European Search Report issued in connection with corresponding EP Application No. 14179076.6 on Dec. 16, 2014.

* cited by examiner

*Primary Examiner* — Christopher E Everett

(74) *Attorney, Agent, or Firm* — Sutherland Asbill & Brennan LLP

(57) ABSTRACT

Systems and methods for estimating a base load in a combined cycle power plant with a steam turbine clutch are provided. According to one embodiment of the disclosure, a system may include a controller and a processor communicatively coupled to the controller. The processor may be configured to receive operating parameters associated with a combined cycle power plant. The combined cycle power plant may comprise a gas turbine permanently coupled to a generator and a steam turbine selectively coupled to the generator via a clutch. The processor may be further configured to receive an engagement status associated with the clutch and receive first data and second data. Based on the engagement status, the processor may select the first data or the second data and use that to estimate a base load. The base load estimation may be calibrated based on the operating parameters.

20 Claims, 7 Drawing Sheets

BASE LOAD ESTIMATION FOR A COMBINED CYCLE POWER PLANT WITH STEAM TURBINE CLUTCH

TECHNICAL FIELD

This disclosure relates generally to combined cycle power plants, and more particularly, to systems and methods for estimating a base load for a combined cycle power plant with a steam turbine clutch.

BACKGROUND

There are numerous situations in which the maximum power output of a power plant needs to be known. For example, the maximum power output may be needed to reserve a certain power capacity, to optimally dispatch the generated power, and to comply with certain requirements.

Estimating the maximum power output (also called the base load) of a power plant may be complex because the base load depends on various factors, including ambient conditions (e.g., temperature and pressure), plant state (e.g., age), fuel properties, and so forth. Some existing base load estimation algorithms may allow accounting for these factors when calculating the base load of a power plant. However, new designs of power plants may require new ways of estimating base loads.

BRIEF DESCRIPTION OF THE DISCLOSURE

The disclosure relates to systems and methods for estimating a base load in a combined cycle power plant with a steam turbine clutch. According to one embodiment of the disclosure, a system is provided. The system may include a controller and a processor in communication with the controller. The processor may be configured to receive operating parameters associated with a combined cycle power plant. The combined cycle power plant may comprise a gas turbine and a steam turbine. The gas turbine may be permanently coupled to a generator while the steam turbine may be selectively coupled to the generator via a clutch. The processor may be further configured to receive an engagement status of the clutch, receive first data indicative of a simple cycle power plant base load at a plurality of operating parameters, and receive second data indicative of a combined cycle power plant base load at the plurality of operating parameters. Based on the engagement status, either the first data or the second data may be selected. Using the selection, a base load may be estimated. The estimation may be calibrated based on the operating parameters.

In another embodiment of the disclosure, a method is provided. The method may include receiving operating parameters associated with a combined cycle power plant. The combined cycle power plant may comprise a gas turbine and a steam turbine, with the gas turbine being permanently coupled to a generator while the steam turbine is selectively coupled to the generator via a clutch. Additionally, an engagement status of the clutch, first data, and second data may be received. The first data may be indicative of a simple cycle power plant base load at a plurality of operating parameters, while the second data may be indicative of a combined cycle power plant base load at the plurality of operating parameters. Based on the engagement status, the first data or the second data may be selected. The selected data may be applied to estimate a base load. The base load estimation may be calibrated using the operating parameters of the combined cycle power plant.

In yet another embodiment of the disclosure, a combined cycle power generation system is provided. The system may include a generator, a gas turbine permanently coupled to the generator, a steam turbine selectively coupled to the generator, a clutch configured to selectively couple the steam turbine to the generator, a controller, and a processor in communication with the controller. The processor may be configured to receive ambient conditions of the combined cycle power generation system and receive an engagement status of the clutch. Additionally, the processor may be configured to receive a simple cycle calculation indicative of a simple cycle power plant base load at the ambient conditions and a combined cycle calculation indicative of a combined cycle power plant base load at the ambient conditions. Based on the engagement status, the simple cycle calculation or the combined cycle calculation may be selected. Using the selected calculation, a base load value may be determined. Furthermore, an actual power output of the generator at a base load condition may be received. Using the base load calculation value and the actual power output, a calibration offset may be computed. The calibration offset may represent a difference between the base load calculation value and the actual power output. The base load calculation value may be continuously calculated using the actual ambient conditions and the base load calculation value may be calibrated using the calibration offset to obtain a calibrated base load.

Other embodiments and aspects will become apparent from the following description taken in conjunction with the following drawings.

DETAILED DESCRIPTION

Figure 1:
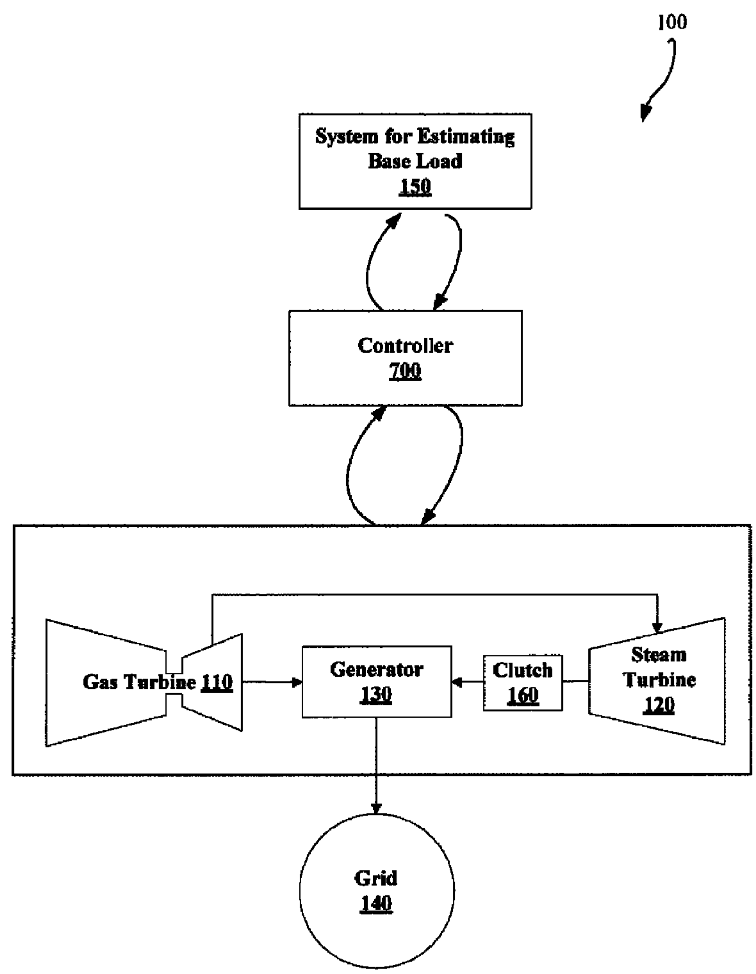
FIG. 1 is a block diagram illustrating an example system environment for estimating base load in a combined cycle power plant with a steam turbine clutch.

The following detailed description includes references to the accompanying drawings, which form part of the detailed description. The drawings depict illustrations, in accordance with example embodiments. These example embodiments, which are also referred to herein as "examples," are described in enough detail to enable those skilled in the art to practice the present subject matter. The example embodiments may be combined, other embodiments may be utilized, or structural, logical, and electrical changes may be made, without departing from the scope of the claimed subject matter. The following detailed description is, therefore, not to be taken in a limiting sense, and the scope is defined by the appended claims and their equivalents.

Certain embodiments described herein relate to a combined cycle power plant with a steam turbine clutch. Such a combined cycle power plant can include a gas turbine and a steam turbine powered by the steam generated by the hot exhaust of the gas turbine. The gas turbine can be permanently connected to an electrical generator, while the steam turbine can be connected to or disconnected from the generator with a clutch. Depending on the clutch status, the total generator power output may include the output of the gas turbine or a combined output of the gas and steam turbines.

Integration of the clutch can be beneficial because such integration may improve operational flexibility of the steam turbine and can reduce auxiliary steam requirements during hot starts. However, certain conventional algorithms may not be used to estimate a base load of a combined cycle power plant with a steam turbine clutch due to the possibility of switching between simple and combined cycle operations.

Certain embodiments described herein relate to systems and methods for base load estimation of a combined cycle power plant with a steam turbine clutch. Certain embodiments can allow estimating a base load by selecting one of two calculations based on the status of the clutch. One of the calculations may be associated with a simple cycle while the other calculation may be associated with a combined cycle. The selected calculation may be used for the base load estimation and calibration process.

The calibration process may start automatically once the power plant is at the base load condition. For calibration, the base load values of the calculation selected based on the clutch status and actual output data provided by the generator sensor may be ascertained and compared. Based on the comparison, the differences between the values of the calculation and the actual output data may be calculated. These calculated calibration differences may be used as a calibration offset. In such a way, base load calculation values may be continuously calibrated using the obtained calibration offset. Therefore, the base load may be estimated for the combined cycle power plant with a steam turbine clutch.

In some embodiments, the calculated calibration offset may be valid even when the gas turbine returns to a partial load after the calibration is complete. The base load calibration offset may be valid as long as the clutch status remains unchanged.

In some embodiments, the base load calibration offset may be recalibrated in case of an operating cycle switch. If a signal indicating a switch in the clutch status is received, the base load calibration may be discarded and the calibration offset may be reset because the power plant has shifted to another cycle and the calculated offset is no longer valid.

The technical effects of certain embodiments of the disclosure may include facilitated dispatching of power to customers and compliance with regulations of grid authorities requiring the plant operator to maintain a certain power reserve. Further technical effects of certain embodiments of the disclosure may include automatic estimate and calibration of a base load based on the clutch status, thus facilitating operations of a combined cycle power plant with a steam turbine clutch and providing operation flexibility by running the power plant either in the combined cycle mode or in the simple cycle mode.

The following provides the detailed description of various example embodiments related to systems and methods for estimating base load for a combined cycle power plant with a steam turbine clutch.

Referring now to FIG. 1, a block diagram illustrates an example system environment 100 suitable for implementing systems and methods for estimating a base load of a combined cycle power plant with a steam turbine clutch, in accordance with one or more example embodiments.

A combined cycle power plant may include a gas turbine 110, a steam turbine 120, and a generator 130. The gas turbine 110 is a primary mover in such configurations as it burns fuel and produces mechanical power. The exhaust of the gas turbine 110 powers the steam turbine 120, which also produces mechanical power. Both turbines 110 and 120 can be mechanically coupled to the generator 130. The generator 130 can convert the mechanical power of the turbines 110 and 120 into electrical power. The generator 130 may be coupled to a grid 140 and provide a supply of electricity to the grid 140. The grid 140 may include various conventional distribution systems.

In some designs, the gas turbine 110 can be permanently coupled to the generator 130, while the steam turbine 120 is coupled to the generator 130 via a clutch 160. The clutch 160 may include, for example, a synchronous self-shifting clutch. Operation of the clutch 160 is described below with reference to FIGS. 2 and 3.

The operation of the combined cycle power plant may be managed through the controller 700. The controller 700 may interact with the system for estimating base load 150 and the grid 140 to control power distribution.

Figure 2:
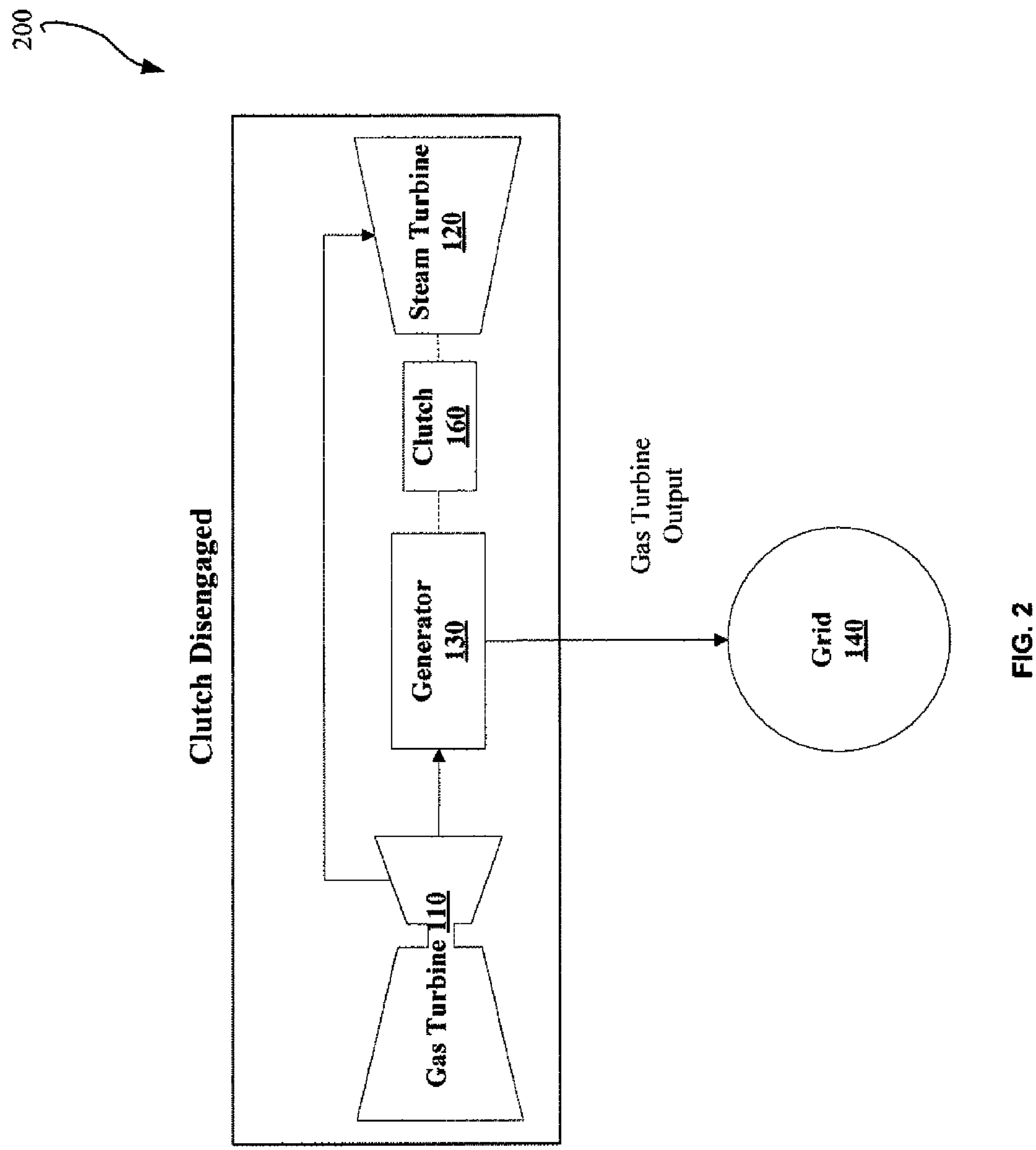
FIG. 2 depicts a block diagram illustrating an example combined cycle power plant with a steam turbine clutch disengaged, in accordance with an embodiment of the disclosure.

FIG. 2 depicts a block diagram illustrating a combined cycle power plant in a clutch disengaged state 200. As shown, a gas turbine 110 and a steam turbine 120 may be located on the same shaft. The gas turbine 110 may be permanently coupled to a generator 130. The steam turbine 120 may be selectively coupled to the generator 130 using a clutch 160. Thereby, the gas turbine 110 may be started and operated without driving the steam turbine 120. This may result in improved efficiency and reduced time from a plant shutdown for inspection and maintenance of the gas turbine 110.

As shown by FIG. 2, in the disengaged state 200, the steam turbine 120 provides no torque to the shaft. Whenever the gas turbine 110 produces mechanical power, it provides the power to the generator 130. However, the steam turbine 120 provides no power to the generator 130 in the disengaged state 200. Therefore, the output of the generator 130 includes the gas turbine 110 contribution only.

Figure 3:
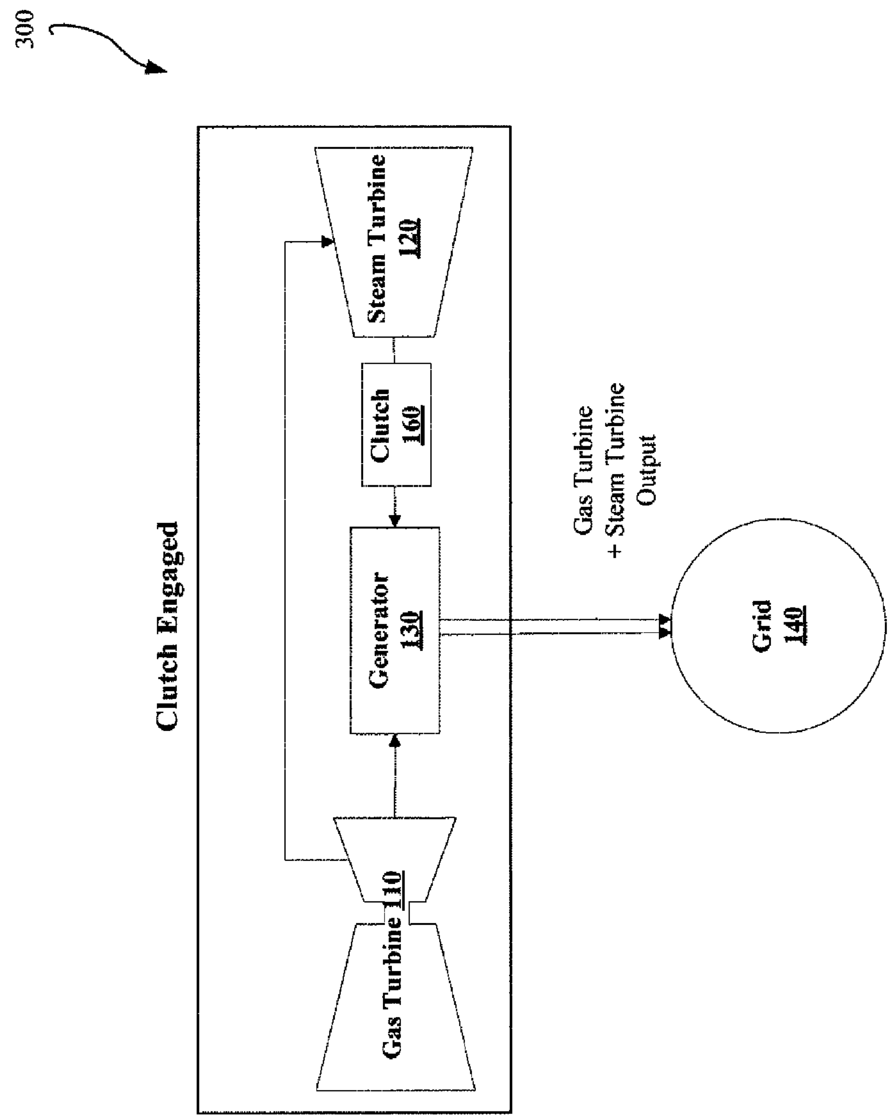
FIG. 3 depicts a block diagram illustrating an example combined cycle power plant with a steam turbine clutch engaged, in accordance with an embodiment of the disclosure.

FIG. 3 depicts a block diagram illustrating a combined cycle power plant in a clutch engaged state 300. As shown, a clutch 160 couples a steam turbine 120 to the generator 130. Thus, the steam turbine 120 may contribute to the output of the generator 130 along with a gas turbine 110. The generator 130 output provides combined power from the gas turbine 110 and the steam turbine 120.

In this operational mode, the power plant may provide a higher output to a grid 140 in comparison to a simple cycle, thus possibly improving the overall efficiency of the plant.

Figure 4:
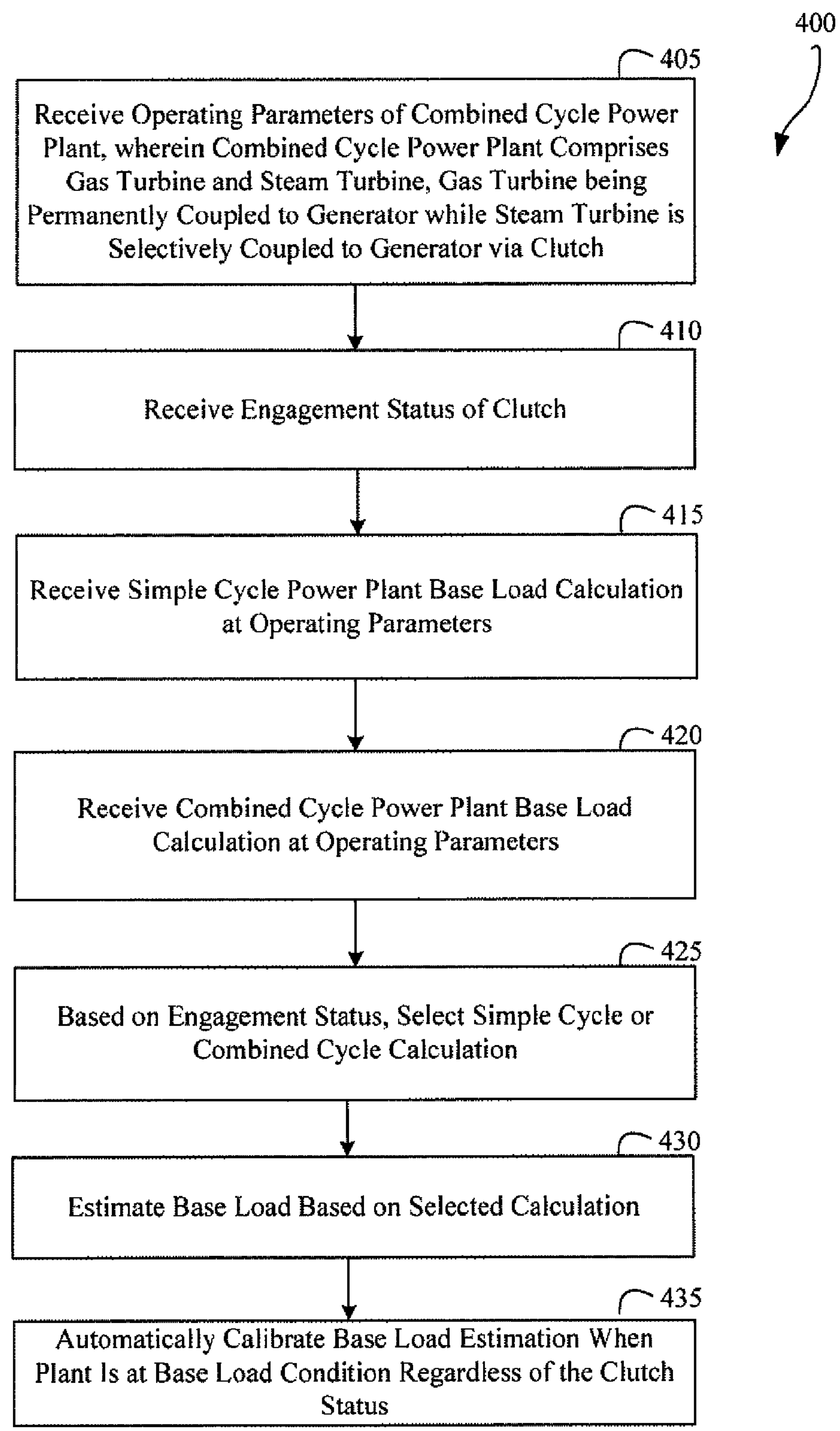
FIG. 4 depicts a process flow diagram of an example method for estimating a base load of a combined cycle power plant with a steam turbine clutch, in accordance with an embodiment of the disclosure.

FIG. 4 depicts a process flow diagram illustrating an example method 400 for estimating a base load for a combined cycle power plant with a steam turbine clutch, in accordance with an embodiment of the disclosure. The method 400 may be performed by processing logic that may comprise hardware (e.g., dedicated logic, programmable logic, and microcode), software (such as software run on a general-purpose computer system or a dedicated machine), or a combination of both. In one example embodiment, the processing logic resides at the controller 700, which may reside in a user device or in a server. The controller 700 may comprise processing logic. It will be appreciated by one of ordinary skill in the art that instructions said to be executed by the controller 700 may, in fact, be retrieved and executed by one or more processors. The controller 700 may also include memory cards, servers, and/or computer disks. Although the controller 700 may be configured to perform one or more steps described herein, other control units may be utilized while still falling within the scope of various embodiments.

As shown in FIG. 4, the method 400 may commence at operation 405 with receiving operating parameters of a combined cycle power plant. The combined cycle power plant may comprise a gas turbine and a steam turbine. The gas turbine may be permanently coupled to the generator, while the steam turbine may be selectively coupled to the generator via a clutch. The received operating parameters may include an ambient temperature, an ambient pressure, an ambient humidity, and so forth.

At operation 410, an engagement status of the clutch may be received from the combined cycle power plant. The engagement status may include an engaged status associated with the steam turbine engaged to the generator and the disengaged status associated with the steam turbine disengaged from the generator.

At operation 415, a simple cycle calculation indicative of a simple cycle power plant base load at the operating parameters may be received. The simple cycle calculation may be associated with the steam turbine being disengaged from the generator. The calculation may include correlations of possible ambient conditions and base loads for this operation mode. In some specific embodiments, the calculation may involve using a transfer function, an online gas turbine model, and so forth.

At operation 420, a combined cycle calculation indicative of a combined cycle power plant base load at the operating parameters may be received. The calculation may include correlations of possible ambient conditions and base loads for a combined cycle power plant, a result of a transfer function, or an online gas turbine model.

In some specific embodiments, reference data related to power plant base loads at various ambient conditions may be received from other sources including databases, data files, and so forth.

Based on the engagement status of the clutch, the simple cycle calculation or the combined cycle calculation may be selected at operation 425. Thus, if the clutch status is "engaged," meaning that the steam turbine is coupled to the generator, the combined cycle calculation may be selected. The simple cycle calculation may be selected if the received clutch status is "disengaged."

Using the selected calculation, a base load of the combined cycle power plant at the received operating parameters may be estimated at operation 430. To estimate the base load, the received operating parameters may be interpolated based on predefined table values or through predefined transfer functions.

On detection of a base load condition of the combined cycle power plant, calibration of the base load estimation may be initiated at operation 435. For calibration, actual power output of the generator at a base load condition may be received. The actual power output may be subtracted from the estimated base load calculation value. The difference may be used as a calibration offset. Thus, the base load estimation may be more accurate and up to date.

In some embodiments, even if the power plant transitions from the base load condition to a part load, the calibration offset may be still applied. Using the offset, an estimated base load based on calculation values corresponding to the operating parameters at that moment may be calibrated.

Additionally, the calculated offset may be valid until a signal indicating a clutch status change is received. The clutch status change may imply that the operating mode of the power plant and its output capacity has changed. Correspondingly, the calibration offset may be discarded.

Figure 5:
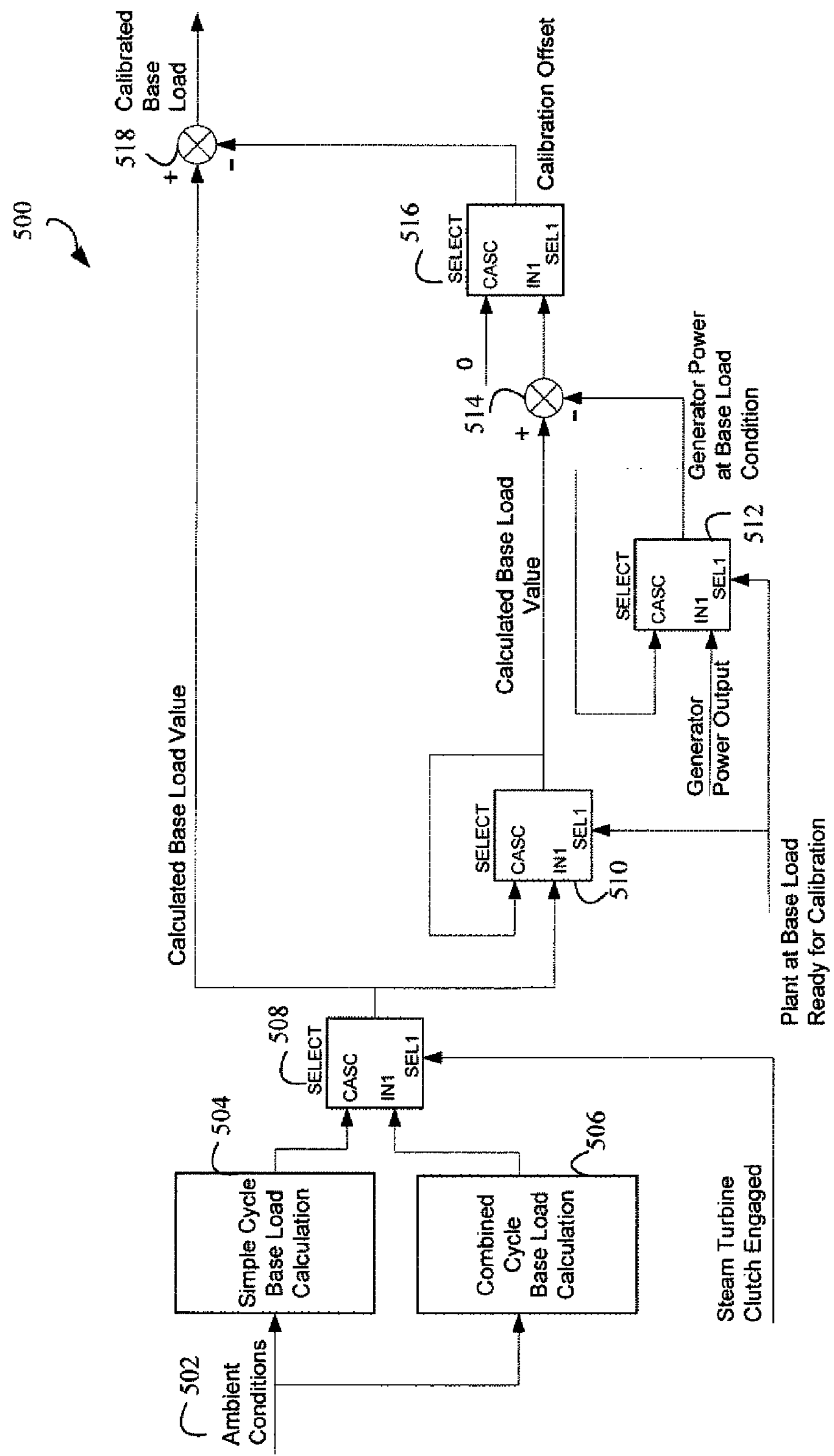
FIG. 5 illustrates an example process flow diagram for estimating a base load of a combined cycle power plant with a steam turbine clutch, in accordance with an embodiment of the disclosure.

An example process associated with estimation of the base load for a combined cycle power plant with a steam turbine clutch is depicted by FIG. 5.

The base load estimation 500 may be based on operating parameters of the combined cycle power plant. As shown by FIG. 5, some of the operating parameters received for estimation 500 may include ambient conditions (e.g., ambient temperature and pressure) 502. The ambient conditions 502 may be used as input to a simple cycle calculation 504 and a combined cycle calculation 506. The simple cycle calculation 504 and the combined cycle calculation 506 may include, for example, methods for interpolation of pre-configured data tables or involve using transfer functions based on the ambient conditions 502. The base load calculation results may be provided to a selection unit 508.

The selection unit 508 may additionally receive an engagement status of the steam turbine clutch. Based on the engagement status, a value associated with one of the two base load calculation results may be selected. If the clutch is disengaged, the value associated with the simple cycle calculation 504 may be selected; if the clutch is engaged, the value associated with the combined cycle calculation 506 may be selected.

The selected base load calculation value may be provided to a selection unit 510 and to a subtraction logic unit 518.

Once the power plant is at the base load condition, the base load calibration process may start automatically. The selection unit 510 may receive a notification that the power plant is at the base load condition. On receipt of the notification, the selection unit 510 may provide the selected base load calculation value to a subtraction logic unit 514. The notification may be additionally provided to a selection unit 512, which captures a generator power output at the base load condition and passes the generator power output to the subtraction logic unit 514. After the generator power output is captured, the calibration may continue even as the power plant returns to a part load condition.

The subtraction logic unit 514 may subtract the received generator power output from the base load calculation value. The resulting value may represent a difference between a calculated value of the base load and actual measures of the generator output at base load condition. This difference may be referred to as a calibration offset of the power plant in a specific operating mode. The calibration offset may be passed to a subtraction logic unit 518 that subtracts the calibration offset from a base load value periodically received from the selection unit 508. However, in some cases, the calibration offset may be discarded by a selection unit 516 (see FIG. 6).

In some embodiments, the base load calculation values may be additionally corrected based on various operating parameters. Such parameters may include ambient pressure, ambient humidity, power plant state, and so forth.

If the power plant returns to a part load after the calibration is complete, the base load calibration offset may be still valid, as long as the clutch status is unchanged. However, when the clutch status is changed, the generator output also changes with the steam turbine contribution changes. Therefore, the clutch status change may be considered in the estimation process.

Figure 6:
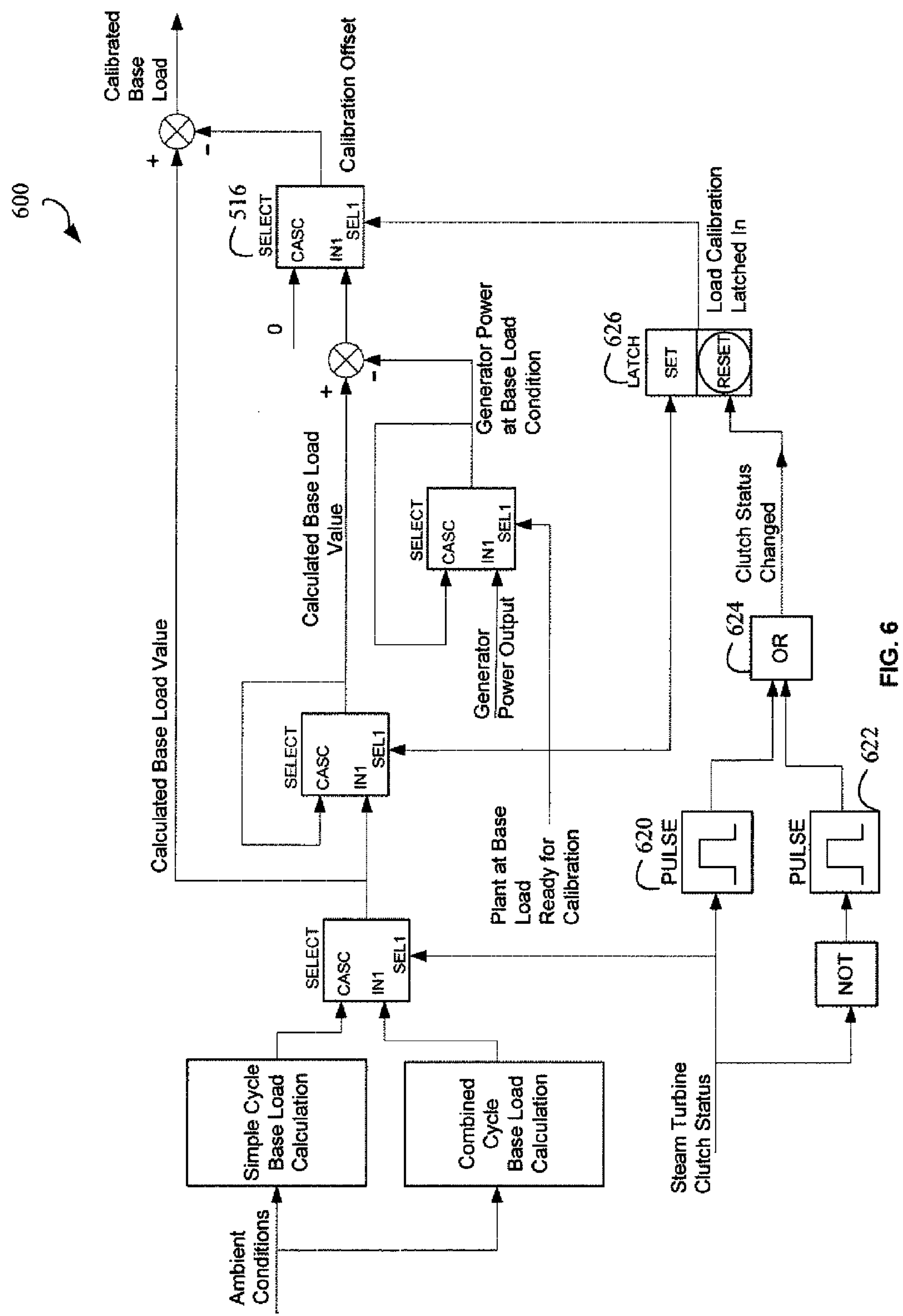
FIG. 6 illustrates an example process flow diagram for estimating a base load of a combined cycle power plant with a clutch status change, in accordance with some embodiments.

FIG. 6 illustrates an example process 600 for estimation of a base load during a clutch status change, in accordance with some embodiments. When the clutch is engaged, a pulse 620 may be generated. When the clutch is disengaged, a pulse 622 may be generated. An OR gate 624 may capture the change in the clutch status with the two pulses as inputs and pass a signal indicating the clutch status to a latch 626.

When the calibration starts, the latch 626 may be set to true, so that the base load difference can be selected by selection unit 516 as the correction offset for the calculated value. If the clutch status changes, the latch 626 may be reset to false and the calibration offset may be discarded, since in this case the calculated offset is no longer valid. For example, the calibration offset may be set to zero.

Figure 7:
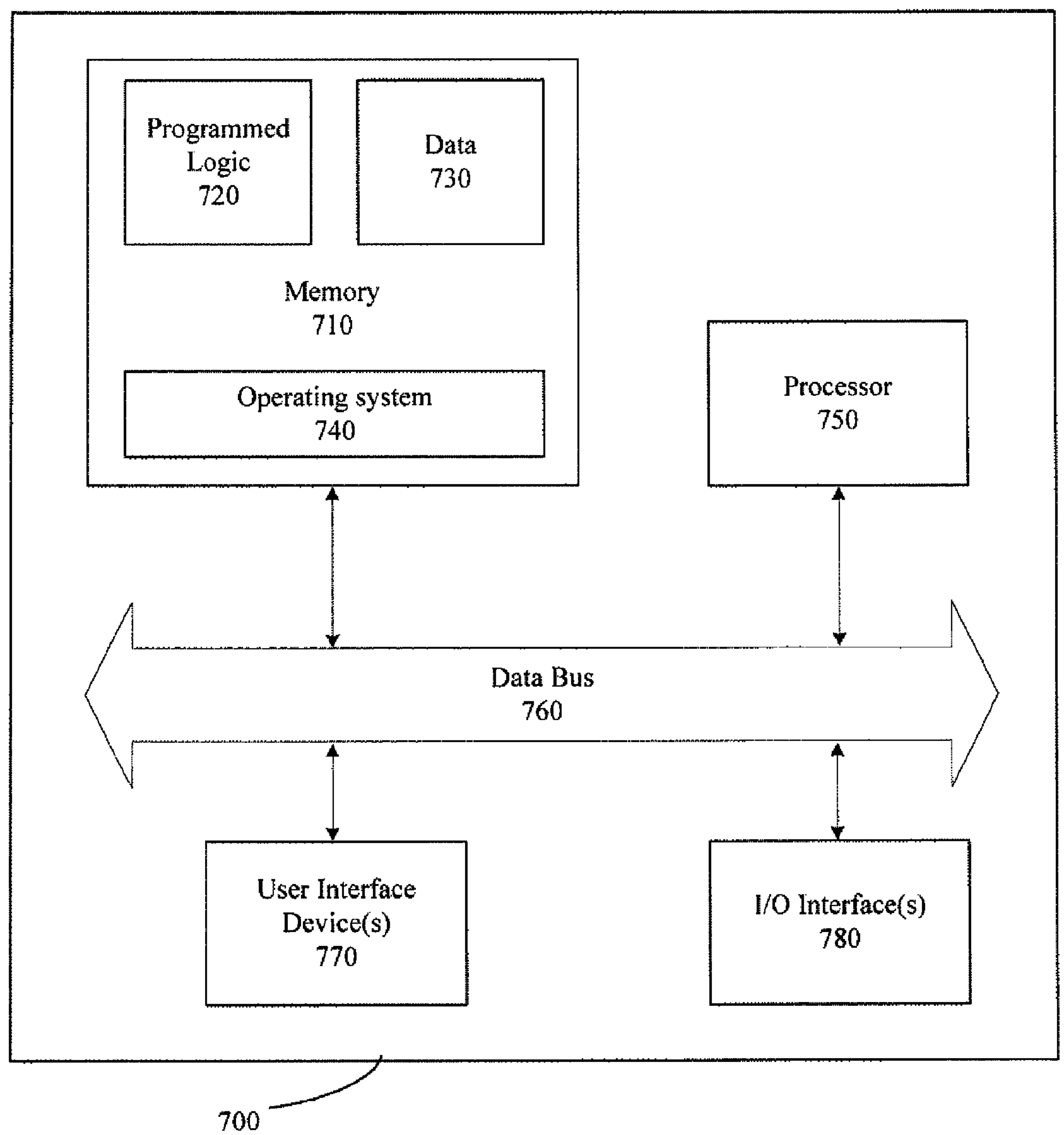
FIG. 7 is a block diagram illustrating an example controller for controlling a combined cycle power plant, in accordance with an embodiment of the disclosure.

FIG. 7 depicts a block diagram illustrating an example controller 700 for controlling a combined cycle power plant with a steam turbine clutch to estimate a base load, in accordance with an embodiment of the disclosure. More specifically, the elements of the controller 700 may be used to select an appropriate calculation based on a status of the steam turbine clutch, calculate a calibration offset based on the data of the selected calculation and operating parameters of the power plant, and apply a calibration offset to calibrate the calculated base load values of a combined cycle power plant. The controller 700 may include a memory 710 that stores programmed logic 720 (e.g., software) and may store data 730, such as the operating parameters of a combined cycle power plant, data indicative of a simple cycle power plant base load at the operating parameters, data indicative of a combined cycle power plant base load at the operating parameters, and the like. The memory 710 also may include an operating system 740.

A processor 750 may utilize the operating system 740 to execute the programmed logic 720, and in doing so may also utilize the data 730. A data bus 760 may provide communication between the memory 710 and the processor 750. Users may interface with the controller 700 via at least one user interface device 770, such as a keyboard, mouse, control panel, or any other devices capable of communicating data to and from the controller 700. The controller 700 may be in communication with the combined cycle power plant online while operating, as well as in communication with the combined cycle power plant offline while not operating, via an input/output (I/O) interface 780. More specifically, one or more of the controllers 700 may carry out the execution of the model-based control system to receive operating parameters associated with a combined cycle power plant; receive an engagement status of the clutch; receive first data indicative of a simple cycle power plant base load at the operating parameters; receive second data indicative of a combined cycle power plant base load at the operating parameters; based at least in part on the engagement status, select the first data or the second data; estimate a base load based at least in part on the selected data; and calibrate the base load estimation based at least in part on the operating parameters. Additionally, it should be appreciated that other external devices or multiple other combined cycle power plants may be in communication with the controller 700 via the I/O interface 780. In the illustrated embodiment, the controller 700 may be located remotely with respect to the combined cycle power plant; however, it may be co-located or even integrated with the combined cycle power plant. Further, the controller 700 and the programmed logic 720 implemented thereby may include software, hardware, firmware, or any combination thereof. It should also be appreciated that multiple controllers 700 may be used, whereby different features described herein may be executed on one or more different controllers 700.

Accordingly, certain embodiments described herein can allow estimating a base load of a combined cycle power plant with a steam turbine clutch by selectively using data associated with a simple cycle or a combined cycle calculation based on the clutch engagement status. The simple cycle calculation may include correlations of possible ambient parameters (e.g., temperature) and base loads of the power plant with the steam turbine disengaged from the generator, whereas the combined cycle calculation may contain similar correlations for the combined output of the power plant when the steam turbine is engaged to the generator. Alternatively, the simple cycle calculation or combined cycle calculation may involve base loads of the power plant calculated using a transfer function, an online gas turbine model, and so forth. Based on the results of the selected calculation, the base load of the power plant may be estimated. In case of a cycle switch during the estimation process, the estimation may be cancelled. Thus, the base load for the power plant may be estimated despite possible switches between operating cycles.

References are made to block diagrams of systems, methods, apparatuses, and computer program products according to example embodiments. It will be understood that at least some of the blocks of the block diagrams, and combinations of blocks in the block diagrams, may be implemented at least partially by computer program instructions. These computer program instructions may be loaded onto a general purpose computer, special purpose computer, special purpose hardware-based computer, or other programmable data processing apparatus to produce a machine, such that the instructions which execute on the computer or other programmable data processing apparatus create means for implementing the functionality of at least some of the blocks of the block diagrams, or combinations of blocks in the block diagrams discussed.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the block or blocks.

One or more components of the systems and one or more elements of the methods described herein may be implemented through an application program running on an operating system of a computer. They also may be practiced with other computer system configurations, including handheld devices, multiprocessor systems, microprocessor based or programmable consumer electronics, mini-computers, mainframe computers, and the like.

Application programs that are components of the systems and methods described herein may include routines, programs, components, data structures, and so forth that implement certain abstract data types and perform certain tasks or actions. In a distributed computing environment, the application program (in whole or in part) may be located in local memory or in other storage. In addition, or alternatively, the application program (in whole or in part) may be located in remote memory or in storage to allow for circumstances where tasks are performed by remote processing devices linked through a communications network.

Many modifications and other embodiments of the example descriptions set forth herein to which these descriptions pertain will come to mind having the benefit of the teachings presented in the foregoing descriptions and the associated drawings. Thus, it will be appreciated that the disclosure may be embodied in many forms and should not be limited to the example embodiments described above. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A method comprising:

receiving operating parameters associated with a combined cycle power plant, wherein the combined cycle power plant comprises a gas turbine and a steam turbine, the gas turbine being permanently coupled to a generator while the steam turbine is selectively coupled to the generator via a clutch;

receiving an engagement status of the clutch;

receiving first data indicative of a simple cycle power plant base load at the operating parameters;

receiving second data indicative of a combined cycle power plant base load at the operating parameters;

based at least in part on the engagement status, selecting the first data or the second data;

estimating a base load based at least in part on the selected data to obtain a base load value, wherein the estimating includes computing a calibration offset, the calibration offset being a difference between the base load value and an actual output of the combined cycle power plant;

detecting a base load condition of the combined cycle power plant; and upon or after the detecting, calibrating the base load value based at least in part on the operating parameters and the calibration offset, wherein the calibration offset is valid for the base load condition and a part load condition of the combined cycle power plant as long as the engagement status of the clutch is unchanged.

2. The method of claim 1, wherein the first data includes a simple cycle calculation and the second data includes a combined cycle calculation.

3. The method of claim 1, wherein the first data is selected based at least in part on the engagement status indicative of the clutch being disengaged.

4. The method of claim 1, wherein the second data is selected based at least in part on the engagement status indicative of the clutch being engaged.

5. The method of claim 1, wherein the first data includes correlations of possible ambient conditions and base loads for the steam turbine disengaged from the generator, and the second data includes correlations of the possible ambient conditions and the base loads for the steam turbine engaged to the generator.

6. The method of claim 1, wherein the operating parameters include one or more of an ambient temperature, a generator power output, or an ambient pressure.

7. The method of claim 1, further comprising:

determining a change in the engagement status of the clutch; and based at least in part on the determination, resetting the calibration of the base load estimation, wherein the resetting of the calibration of the base load estimate includes:

based at least on the determination of the change in the engagement status, selecting the first data or the second data;

re-estimating the base load based at least on the re-selected data to obtain the base load value, wherein the re-estimating includes computing the calibration offset;

detecting the base load condition of the combined cycle power plant; and upon or after the detecting, calibrating the base load value based at least on the operating parameters and the calibration offset.

8. The method of claim 1, wherein the estimating includes:

calculating a base load value using the selected data, the calculation being based at least in part on an interpolation of the operating parameters;

receiving an actual power output of the combined cycle power plant at a base load condition;

computing a calibration offset using the base load value and the actual power output, the calibration offset being a difference between the base load value and the actual power output; and continuously calculating the base load value using the operating parameters.

9. The method of claim 8, wherein the base load includes the base load value after a subtraction of the calibration offset.

10. The method of claim 1, wherein the base load is a maximum power output of the combined cycle power plant.

11. A system comprising:

a controller;

a processor communicatively coupled to the controller and configured to:

receive operating parameters associated with a combined cycle power plant, wherein the combined cycle power plant comprises a gas turbine and a steam turbine, the gas turbine being permanently coupled to a generator while the steam turbine is selectively coupled to the generator via a clutch;

receive an engagement status of the clutch;

receive first data indicative of a simple cycle power plant base load at the operating parameters;

receive second data indicative of a combined cycle power plant base load at the operating parameters;

based at least in part on the engagement status, select the first data or the second data;

estimate a base load based at least in part on the selected data to obtain a base load value, wherein the processor is further configured to compute a calibration offset, the calibration offset being a difference between the base load value and an actual output of the combined cycle power plant;

detect a base load condition of the combined cycle power plant; and upon or after the detection, calibrate the base load value based at least in part on the operating parameters and the calibration offset, wherein the calibration offset is valid for the base load condition and a part load condition of the combined cycle power plant as long as the engagement status of the clutch is unchanged.

12. The system of claim 11, wherein the first data is selected based at least in part on the clutch being disengaged.

13. The system of claim 11, wherein the second data is selected based at least in part on the clutch being engaged.

14. The system of claim 11, wherein the first data includes correlations of possible ambient conditions and base loads for the steam turbine disengaged from the generator, and the second data includes correlations of the possible ambient conditions and the base loads for the steam turbine engaged to the generator.

15. The system of claim 11, wherein the operating parameters include one or more of an ambient temperature, a generator power output, and an ambient pressure.

16. The system of claim 11, wherein the processor is further configured to:

determine a change in the engagement status of the clutch; and based at least in part on the determination, reset the calibration of the base load estimation, wherein the resetting of the calibration of the base load estimate includes:

based at least on the determination of the change in the engagement status, selecting the first data or the second data;

re-estimating the base load based at least on the selected data to obtain the base load value, wherein the re-estimating includes computing the calibration offset;

detecting the base load condition of the combined cycle power plant; and upon or after the detection, calibrating the base load value based at least on the operating parameters and the calibration offset.

17. The system of claim 11, wherein the base load includes the base load value after a subtraction of the calibration offset.

18. The system of claim 11, wherein the estimating includes:

calculating a base load value using the selected data, the calculation being based at least in part on an interpolation of the operating parameters;

receiving an actual power output of the combined cycle power plant at a base load condition;

computing a calibration offset using the base load value and the actual power output, the calibration offset being a difference between the base load value and the actual power output; and continuously calculating the base load value using the operating parameters.

19. A combined cycle power generation system, the system comprising:

a generator;

a gas turbine permanently coupled to the generator;

a steam turbine selectively coupled to the generator;

a clutch configured to selectively couple the steam turbine to the generator;

a controller in communication with the gas turbine, the steam turbine, and the generator; and a processor in communication with the controller and configured to:

receive ambient conditions of the combined cycle power generation system;

receive an engagement status of the clutch;

receive a simple cycle calculation indicative of a simple cycle power plant base load at the ambient conditions;

receive a combined cycle calculation indicative of a combined cycle power plant base load at the ambient conditions;

based at least in part on the engagement status, select the simple cycle calculation or the combined cycle calculation;

determine a base load value using the selected calculation;

receive an actual power output of the generator at a base load condition;

compute a calibration offset using the base load value and the actual power output, the calibration offset being a difference between the base load value and the actual power output;

continuously calculate the base load value using the actual ambient conditions; and detect the base load condition of the combined cycle power plant;

upon or after the detection, calibrate the base load value using the calibration offset to obtain a calibrated base load, the calibrated base load being the base load value after a subtraction of the calibration offset, wherein the calibration offset is valid for the base load condition and a part load condition of the combined cycle power plant as long as the engagement status of the clutch is unchanged.

20. The combined cycle power generation system of claim 19, wherein the processor is further configured to:

determine a change in the engagement status of the clutch; and based at least in part on the determination, reset the calibration, wherein the processor is further configured to:

based at least on the determination of the change in the engagement status, select the simple cycle calculation or the combined cycle calculation;

determine the base load value using the selected calculation;

compute the calibration offset using the base load value and the actual power output;

detect the base load condition of the combined cycle power plant; and upon the detection, calibrate the base load value using the calibration offset to obtain the calibrated base load.

* * * * *